(12) United States Patent
Erler et al.

(10) Patent No.: US 11,977,227 B2
(45) Date of Patent: May 7, 2024

(54) METHODS AND DEVICES FOR DATA PROJECTION

(71) Applicant: Carl Zeiss Jena GmbH, Jena (DE)

(72) Inventors: Christoph Erler, Jena (DE); Matthias Burkhardt, Eichenberg (DE); Alexandre Gatto, Jena Muenchenroda (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 17/993,535

(22) Filed: Nov. 23, 2022

(65) Prior Publication Data

US 2023/0168503 A1 Jun. 1, 2023

Related U.S. Application Data

(63) Continuation of application No. 15/545,873, filed as application No. PCT/EP2016/052431 on Feb. 4, 2016, now abandoned.

(30) Foreign Application Priority Data

Feb. 5, 2015 (DE) ...................... 10 2015 101 687.7

(51) Int. Cl.
*G02B 27/01* (2006.01)
*B60K 35/00* (2006.01)

(52) U.S. Cl.
CPC .......... *G02B 27/0103* (2013.01); *B60K 35/00* (2013.01); *B60K 2370/1531* (2019.05);
(Continued)

(58) Field of Classification Search
CPC ................ G02B 27/01; G02B 27/0101; G02B 27/0103; G02B 2027/0105–0109;
(Continued)

(56) References Cited

U.S. PATENT DOCUMENTS 4,790,613 A * 12/1988 Moss ....................... G03H 1/22
340/461
5,112,121 A * 5/1992 Chang ................ G02B 27/0103
359/24

(Continued)

*Primary Examiner* — Stephone B Allen
*Assistant Examiner* — Jyotsna V Dabbi
(74) *Attorney, Agent, or Firm* — Seyfarth Shaw LLP; Brian Michaelis (57) ABSTRACT

A device for data projection, includes a holographic element arranged as a imaging element for a windshield. An imaging device has a first imaging system and a second imaging system configured to illuminate the holographic element. The holographic element has a first volume hologram structured to be angle-selective for light under a first illumination angle and to generate a first two-dimensional virtual image at a first fixed distance from the holographic element corresponding to the first image data, and a second volume hologram structured to be angle-selective for light under a second illumination angle and to generate a second two-dimensional virtual image at a second fixed distance from the holographic element different from the first distance corresponding to the second image data, such that the first and second images are viewable separately and simultaneously by a person.

16 Claims, 7 Drawing Sheets

(52) U.S. Cl.
CPC .. *B60K 2370/188* (2019.05); *B60K 2370/333* (2019.05); *B60K 2370/334* (2019.05); *G02B 2027/0109* (2013.01)

(58) Field of Classification Search
CPC ...... G02B 2027/013; G02B 2027/0145; G02B 2027/0147; B60K 35/00; B60K 2370/00; B60K 2370/1529; B60K 2370/152; B60K 2370/1531; B60K 2370/188; B60K 2370/33; B60K 2370/333; B60K 2370/334; B60K 2370/34; B60K 2370/341; B60K 2370/347
USPC .......................................................... 359/13
See application file for complete search history.

(56) References Cited

U.S. PATENT DOCUMENTS

| | | | | |
|---|---|---|---|---|
| 5,589,956 | A * | 12/1996 | Morishima | G02B 27/0172 345/9 |
| 2006/0228073 | A1* | 10/2006 | Mukawa | G02B 5/18 385/31 |

* cited by examiner

METHODS AND DEVICES FOR DATA PROJECTION

CROSS-REFERENCE TO RELATED APPLICATIONS DATA

This application is a continuation of U.S. patent application Ser. No. 15/545,873 filed Jul. 24, 2017, which is a U.S. National Stage Application of PCT Application No. PCT/EP2016/052431 filed Feb. 4, 2016 which claims priority to Germany Patent Application No. DE102015101687.7 filed Feb. 5, 2015, all of which are incorporated herein by reference.

FIELD OF THE DISCLOSURE

The present application relates to methods and devices for data projection, in particular for what are known as head-up displays (HUDs). The present application in particular relates to methods and devices of this type that may be used in vehicles, in particular in motor vehicles. However, the methods and devices described in this application can also be used for different applications, in particular in all transparent panes. For example, the described methods and devices can also be used in transparent panes of other vehicles, such as trains, buses, ships or planes, or in real estate for windowpanes, if data projection is desired there.

BACKGROUND

Methods and devices for data projection are increasingly used to provide data to a user in a simple manner. The term "data" should here be understood in general terms, for example, projected data can comprise images, videos, symbols, characters and/or numbers.

One area of application of such methods and devices for data projection is the automotive field, for example for providing data to a handler of a vehicle, for example a driver of a car, during driving. This can be realized, for example, by way of corresponding elements in a windshield of a vehicle, as a result of which the driver does not need to specifically direct his gaze onto a display, for example of an instrument cluster, in order to obtain data, but can substantially perceive said data without substantially averting his gaze from the road.

Such methods and devices are known, for example, generally from DE 10 2008 039 737 A1. That document proposes a holographic optical element in a windshield for providing a reflection for the human eye, wherein the concepts in particular relating to inclined windshields of passenger cars are explained.

Further examples of data projection which may be used for example also for car applications are known from WO 2014/115095 A2. Here, a holographic screen is used, and, depending on the distance of this screen from a human eye, a special contact lens is required to be able to focus onto this screen in a simple manner.

SUMMARY

It is therefore an object of the present application to provide improved devices and methods for data projection.

According to a first aspect, a device for data projection is provided, comprising a holographic element to be arranged by, e.g. in or on, a carrier, and an imaging device that is adapted and arranged to transmit light corresponding to data to be projected to the holographic element, wherein the holographic element is adapted to steer light received from the imaging device to a viewing site.

By using a hologram, in particular an imaging hologram, a compact structure as possible. The apparatus can be adapted to represent a three-dimensional object. To this end, the imaging device can comprise an amplitude modulator and a phase modulator for generating three-dimensional images.

It is thus possible, in a comparatively simple manner, to provide three-dimensional objects, for example for control elements.

The holographic element can be adapted for imaging an image provided by the imaging device onto at least one intermediate image which is viewable from the viewing site.

A distance between the intermediate image and the viewing site can here be at least 2 m, but is not limited thereto.

The at least one intermediate image can comprise a real image. It is also possible hereby for example for 2D or 3D images (or objects) to be represented in a plane between the holographic element (or a display) and a viewer.

Additionally or alternatively, the at least one intermediate image can comprise a virtual image.

The at least one intermediate image can comprise at least two intermediate images. In this way, representation in different planes, at different sites or for different viewers is possible.

The at least two intermediate images can be arranged in particular at various distances from the holographic element, which corresponds to a representation in different planes.

The at least two intermediate images can also be viewable from respectively different viewing sites. For example, different contents can be provided to different viewers (e.g. driver and front passenger), or the size of an available eyebox can be increased.

The holographic element can be adapted for generating a first intermediate image of the at least two intermediate images on the basis of a first group of wavelengths, and a second intermediate image of the at least two intermediate images on the basis of a second group of wavelengths that differ from the wavelengths of the first group. In this way, separate color images can be generated.

The imaging device can comprise a first imaging system for generating a first intermediate image of the at least two intermediate images and a second imaging system for generating a second intermediate image of the at least two intermediate images, wherein the first imaging system and the second imaging system are arranged at different sites. Here, an angle selectivity of the holographic element is exploited.

The holographic element can also comprise a holographic diffusion screen. In such a design, the hologram plane acts as a projection screen for a defined wavelength and deflection angle range. Consequently, the use of compact laser projectors is in particular made possible. In this case, the image is formed directly on the pane as a real image.

The device can furthermore comprise the carrier, wherein the carrier can comprise a windshield which is arranged at an angle of <30°, for example <15° or equal to 15°, with respect to the perpendicular.

By adapting the holographic element to an approximately perpendicular carrier (for example in the range of less than 30° with respect to the perpendicular), a simple application in trucks, buses and other vehicles, which have approximately perpendicular front panes, is possible.

An angle between a chief ray of the light coming from the imaging device in a direction of the holographic element and a perpendicular on the windshield can here be between 40 and 80°.

The holographic element can be adapted to direct light, which is incident on the holographic element at a specific angle range, to the viewing site, and to be transparent for light outside the specific angle range.

The holographic element can be adapted to be transparent for light outside one or more specified wavelength ranges, wherein the wavelength ranges can have in particular a spectral bandwidth of <20 nm or <10 nm. Within the one or more wavelength ranges, the holographic element can have, for example, a high diffraction efficiency. The one or more wavelength ranges can then be used as operating wavelengths of a head-up display.

By way of using such a narrow band, a high transparency can in particular be achieved for the largest portion of the visible light, despite the provision of the holographic element. The environment impression is not noticeably impacted by it.

The one or more wavelength ranges can comprise a wavelength in the red range, a wavelength in the green range, and a wavelength in the blue range. It is preferred here for wavelengths of this imaging device to be tuned exactly to the wavelengths of the holographic element, for example with a deviation of less than 2 nm, which makes it possible for pixels of different colors to be located laterally and exactly one on top of the other in the depth and thus for mixed colors, e.g. white, to be generated relatively precisely. In the case of monochromatic use, greater deviations or a greater operating range (for example in the range of 30 nm) are possible. It is also possible for more than three such wavelengths to be used, for example to permit polychromatic operation.

The one or more wavelength ranges can comprise a first group of wavelength ranges and a second group of wavelength ranges, wherein the holographic element can be adapted to direct wavelengths of the first group to a different viewing site than wavelengths of the second group. Representation of color images at different sites is thus possible.

In particular, the combination of operating wavelengths and a chief deflection direction can be realized in a targeted manner such that the reflection hologram in or on the pane blocks light from the environment, in particular from the main viewing directions of the vehicle handler, wherein the blocked wavelengths can correspond to those of commercial laser pointers. In this design, the specifically adapted HUD is additionally able to effectively reduce the risk of accidental or deliberate glare or injury to the driver due to laser sources which are not eye-safe.

The holographic element can be adapted to protect a viewer of the holographic element against external laser radiation.

The holographic element can have an imaging function.

The holographic element can be adapted—e.g. by way of suitable light exposure—to a curvature of the carrier, e.g. a windshield.

According to a second aspect, a method for operating a device as described above is provided, comprising: illuminating the holographic element of the device, and directing the light to the viewing site by way of the holographic element.

Said illuminating can comprise illuminating with light of a red wavelength, a green wavelength, and a blue wavelength.

Provided according to a third aspect is the use of a holographic element in a windshield for protecting against laser pointers.

BRIEF DESCRIPTION OF THE DRAWINGS

Various embodiments of the present invention will be explained in more detail below with reference to the attached drawings, in which.

DETAILED DESCRIPTION

Various embodiments will be explained in detail below. These embodiments serve only for illustrative purposes and are not to be interpreted as being limiting. By way of example, embodiments having a multiplicity of features, elements and details will be described, which should not be interpreted as meaning that all these features, elements or details are necessary for the implementation. Rather, it is possible in other embodiments for some of the elements, features and details to be omitted and/or to be replaced by alternative features, elements and details. Elements, features and details of different embodiments can be combined with one another.

In embodiments, a holographic element for data projection is used. The holographic element can in particular be wavelength-selective, for example for a red, a green, and/or a blue wavelength, and be transparent for other wavelengths.

Figure 1:
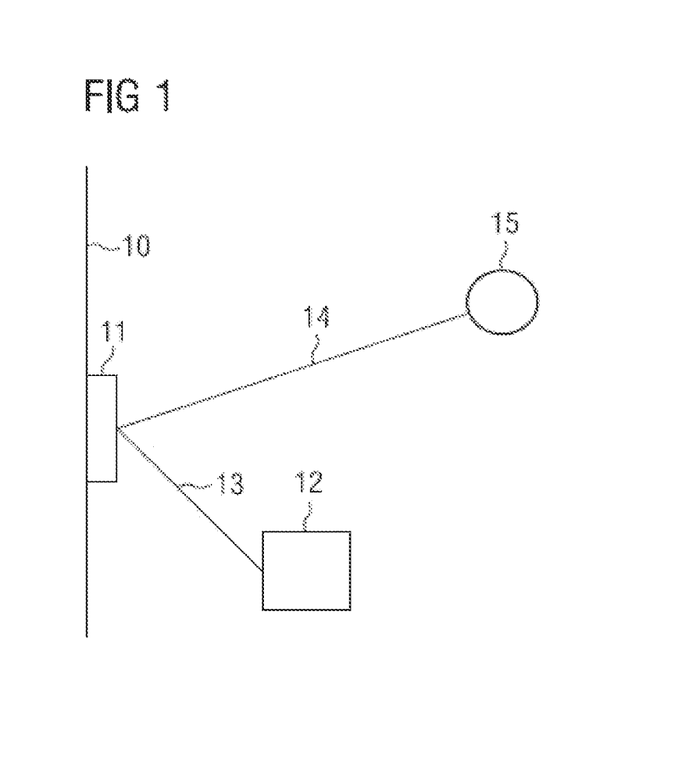
FIG. 1 shows a schematic illustration of a device for data projection according to an embodiment.

FIG. 1 illustrates a device according to an embodiment. In the embodiment of FIG. 1, a holographic element 11 is mounted on a carrier 10. The carrier 10 can be, in particular, a windshield of a vehicle. In a preferred embodiment, the carrier 10 is an approximately perpendicular windshield, for example a windshield which is inclined by at most 15° or at most 10° with respect to the perpendicular, as is used for example in buses or trucks. Such windshields can in particular have curvatures. The holographic element 11 is provided on or in the carrier 10. The holographic element 11 can act, for example, as a diffusion screen, but can also have an imaging effect for generating an intermediate image. Examples of this will be explained below with reference to FIGS. 2 and 3.

The holographic element 11 can be wavelength-selective in a narrow band, i.e. have an imaging function and/or diffusion-screen function only for wavelengths within one or more narrow spectral ranges, while it remains transparent for the remaining wavelengths. In this way, the holographic element 11 is transparent for most wavelengths, and permits, for example, a view through a windshield which serves as the carrier 10. Narrowband in this case can be understood to mean that a function of the holographic element applies only in one or more spectral ranges of a width of <20 nm or <10 nm, in particular for specific wavelengths±a production-related tolerance.

In particular, a holographic function for a red, a blue, and a green wavelength can be present, as a result of which projection of colored data becomes possible with simultaneous pellucidity for the greatest portion of the visible light.

The device of FIG. 1 furthermore comprises an imaging device 12 (also referred to as imaging system below), which directs light, corresponding to data to be projected, toward the holographic element 11. In a holographic element 11 having a diffusion-screen function, the imaging device 12 can scan, for example, the holographic element 11 by way of one or more laser beams (for example a red, a green, and/or a blue laser beam). In a holographic element 11 having an imaging function for generating a virtual intermediate image, the imaging device 12 itself can have, for example, a diffusion screen, and the light corresponding to the light on the diffusion screen is directed to the holographic element 11 in the form of light 13. In other embodiments, the imaging device 12 can also comprise, for example, a display such as an (O)LED, LCD or TFT display as an imaging element.

The holographic element 11 then directs the light 13 corresponding to a holographic function of the holographic element 11, in the form of light 14, to an eye 15 of a viewer, as a result of which the viewer can view the projected data.

As has already been explained in the introductory part, the term "data" should here be understood in wide terms and can refer to any number of symbols, letters, numbers, images, videos and/or combinations thereof.

By way of the use of the holographic element 11, in particular an imaging holographic element, the installation space required for the data projection can be reduced. In particular, imaging properties of the hologram 11 can be selected such that further imaging elements, for example for magnification, such as for example free-form mirrors or lenses, and/or elements for beam folding are not necessary.

Figure 2:
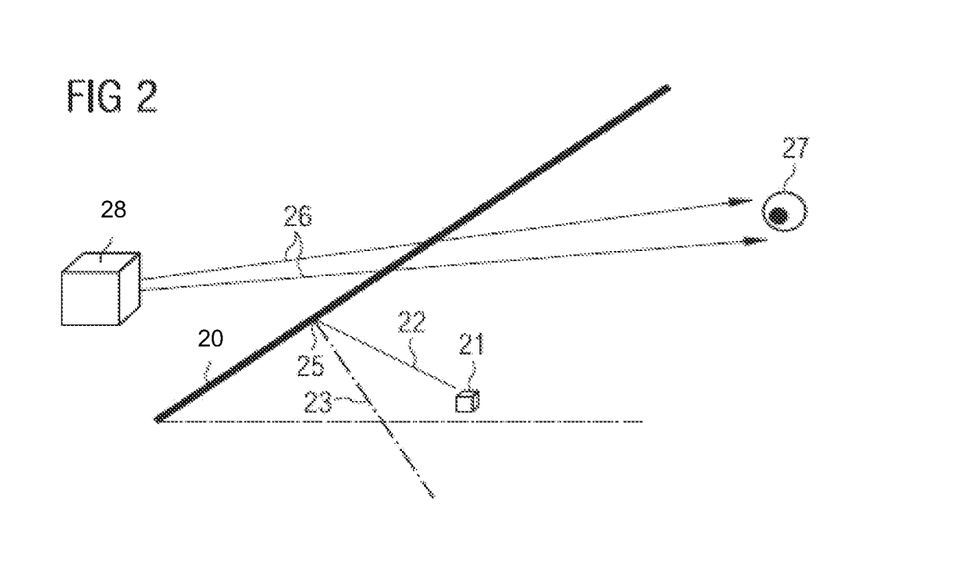
FIG. 2 shows an illustration of a device for data projection according to a further embodiment.

FIG. 2 shows a device for data projection according to an embodiment. The embodiment of FIG. 2 serves for projecting data into a windshield 20, which serves as a carrier for a holographic element 25. In the illustrated embodiment, the windshield 20 is inclined. In other embodiments, the windshield 20 can be perpendicular or approximately perpendicular, as is the case e.g. in a windshield of a truck or a bus.

A holographic element 25 is arranged on or in the windshield 20. The holographic element 25 can in particular comprise a volume hologram, in which an imaging function was holographed in one or more layers. In a preferred embodiment, this function can in particular be holographed for three discrete wavelengths in the red, blue and green ranges, such that the holographic element 25 has, as described below, an imaging function for these three wavelengths, while it is transparent for other wavelengths and thus in particular permits the view through the windshield.

An imaging device 21 illuminates, as indicated by a ray 22, the holographic element 25 with an image to be represented corresponding to the data to be projected. The image to be represented can be generated, for example, by scanning a diffusion screen with one or more lasers or by way of a display apparatus, such as an LCD display, a TFT display or a light-emitting diode (LED) display (for example on the basis of organic light emitting diodes (OLEDs)).

The holographic element 25 is here illuminated with the image at an angle with respect to a perpendicular 23 on the windshield 20, wherein the angle can depend on a configuration of the holographic element 25. In particular, the holographic element 25 shows in some embodiments an imaging function only for one or more specific incidence angles (for example between the light ray 22 and the perpendicular 23), while it is transparent for other angles.

In the embodiment of FIG. 2, the holographic element 25 images the received image onto a virtual image 28. The virtual image 28 is, as indicated by way of rays 26, represented for an eyebox of a viewer's eye 27.

The angle at which the virtual image 28 appears for the eye 27 here differs from the angle at which the image, corresponding to the ray 22, falls onto the holographic element 25. The participating angles can be adapted by way of the design of the respective holographic element 25. In particular, the participating angles can be taken into consideration during the light exposure of the hologram as can a curvature of the windshield 20.

The function of the holographic element in specific embodiments thus becomes effective only for one or more selected wavelengths and only for the incidence at one or more angles, because a Bragg condition has been met only for these angles and wavelength, for example. Light of a different color passes through the holographic element without being obstructed, such that the pane in this case is transparent.

The embodiment of FIG. 2 can thus be simply adapted to many different windshields and can be used in particular for approximately perpendicular windshields.

With preference, the virtual image 28 is imaged at a distance of >2 m, with more preference >4 m, in particular >6 m or >8 m, from the eye 27. In this way, no change or only minor change in the focus of the eye 27 between viewing for example of a road through the windshield 20 and viewing the virtual image 28 is necessary. This can facilitate viewing of the virtual image 28 and thus of the projected data, and can be, for example, less tiring for an eye than in cases in which it is necessary to constantly switch focus between a near virtual image and the road. In other embodiments, the virtual image can also be generated at a distance of <2 m.

In the embodiment of FIG. 2, for example an angle between the ray 22 and the perpendicular 23 can be in the range of 35°, the windshield can be at an angle of 30° with respect to the horizontal, and a distance of the eye 27 from the windshield can be approximately 80 cm. A viewing angle for the virtual image 28 can be in the range of 5°-7°, and the viewing of the virtual image 28 can be performed at an angle of approximately 65° with respect to the perpendicular on the windshield. For a light exposure setup, corresponding angles can then be selected for the exposure of the hologram.

Figure 5:
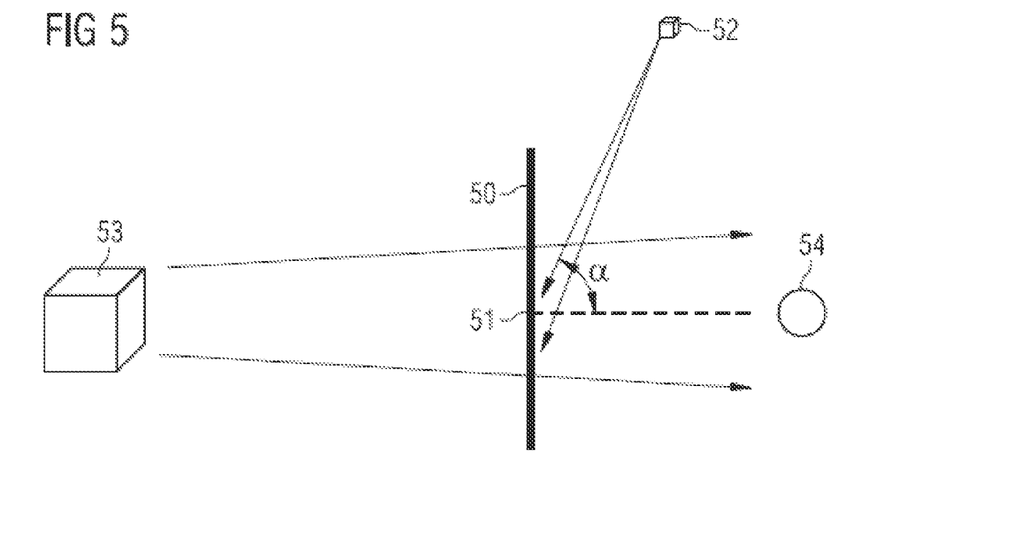
FIG. 5 shows an illustration of a device for data projection according to a further embodiment.

FIG. 5 illustrates a device similar to the device of FIG. 2 for the case of a perpendicular windshield. The windshield is here designated with 50, while 51 designates a position of a corresponding holographic element. An imaging device 52 illuminates the holographic element 51 at an angle α between a chief ray from the imaging device 52 to the holographic element 51 and a perpendicular on the windshield 50, for example between 40 and 80°, with an image that corresponds to data to be projected. The holographic element 51 images this image in virtually magnified fashion, wherein the virtual image 53 can be viewed by an eye 54 in an eyebox. The use of the holographic element 51 here offers the advantage, compared for example to projection head-up displays, that illumination can take place at a substantially arbitrary angle α (e.g. between 40 and 80°) and viewing can occur near the normal, with the result that here the angle of incidence and the emission angle can differ. The imaging device 52 can here be arranged, for example, in a position above (as shown) or below the windshield. Corresponding configurations are also possible with holographic diffusion screens, as will be described in more detail below.

It is thus possible to set up a device for data projection for vehicles having perpendicular windshields, such as busses, trucks or commercial vehicles, for which, up until now, there has been no possibility of a head-up display by way of conventional projection solutions.

Figure 3:
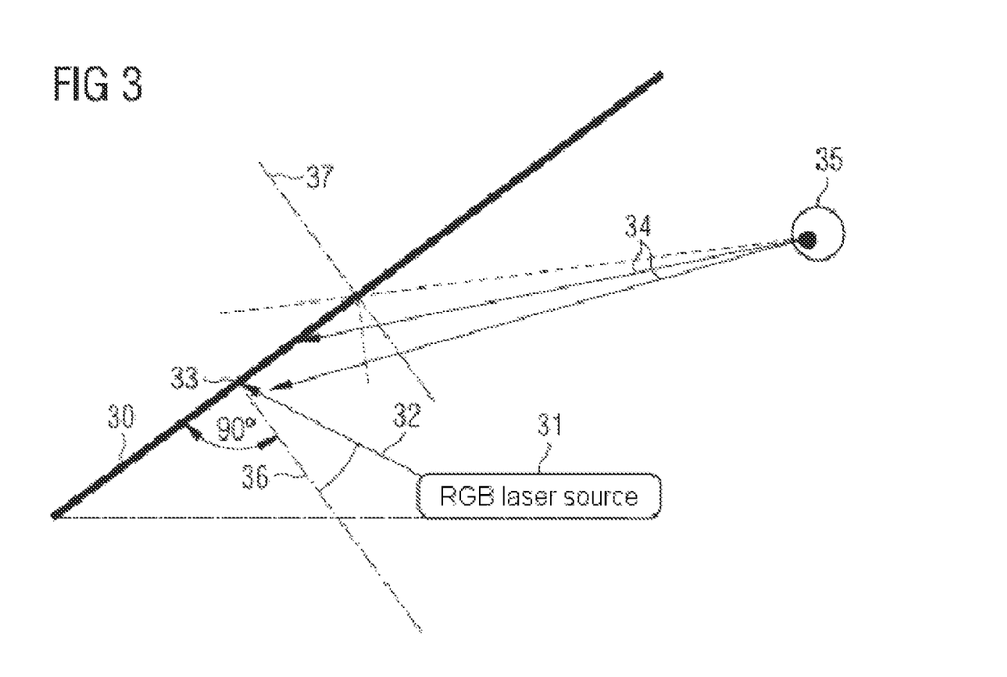
FIG. 3 shows an illustration of a device for data projection according to a further embodiment.

FIG. 3 illustrates a device according to a further embodiment. In the embodiment of FIG. 3, a holographic element 33 is again provided in a windshield 30. The holographic element 33 has, in the embodiment of FIG. 3, a diffusion-screen function (also referred to as a holographic diffusion screen). This diffusion-screen function can again be realized in particular for specific angles of incidence of incident light 32 to a perpendicular 36 and for specific wavelengths, preferably a red, a green, and/or a blue wavelength. For other wavelengths or angles, the holographic element 33 can be transparent.

By providing a diffusion-screen function, no intermediate image needs to be generated. The holographic element can be directly illuminated, in particular scanned, for example, by way of a laser light source 31. Here, the image construction occurs, for example as in conventional cathode ray tubes, through line-wise, fast deflection of a light point. The light point in the present case is generally formed by a laser focus and is modulated temporally during the deflection movement in terms of its brightness such that, on account of time averaging within a time interval that the human eye can no longer resolve, the image impression is obtained.

In an embodiment, the laser light source 31 has three different lasers of red, green, and blue color, with which the holographic element 33 can be scanned such that color representation is possible. However, other types of polychromatic image generation are possible, i.e. image generation with a plurality of colors. For example, display possibilities using a micromirror device (DMD, Digital Micromirror Device) or a liquid-crystal device (for example LCoS, Liquid Crystal On Silicon) can be used with temporal triggering. The entire image is here represented successively in the individual colors, with the time sequence of the representation being so quick that the viewer sees only the polychromatic image with the desired image coloring.

For polychromatic image representation, it is important here for typical holographic elements that the wavelengths of the image generation (for example red, green, and blue wavelength) are adapted exactly to the operating wavelengths of the holographic element. Typically, the deviation between the wavelengths used and the operating wavelengths of the holographic element should be no more than 2 nm. If greater deviations occur, green, red, and blue pixels of the virtual image may no longer be located exactly one on top of the other and thus no correct color mixing takes place. With more accurate tuning, by contrast, the pixels for the different colors are located one on top of the other, and substantially any desired color, for example white or yellow, can be generated.

In other embodiments, however, monochromatic representation can also be used, in particular if it is sufficient for a specific application (for example representation of texts or numbers). In this case, exact tuning of the wavelengths is not necessary, and the holographic element can be designed for example for a comparatively wide operating range in a range of, for example, 30 nm. The light generated by the imaging system then only has to be located within this operating range to generate an image with the lowest possible distortion.

As indicated by rays 34, the image projected onto the holographic element 33, which acts as a diffusion screen, can then be viewed by an eye 35 at an angle to the perpendicular 37. The site of origin of the light for a specific pixel is here determined by the interaction of the laser projector with the geometry of the pane. A low-distortion image can be perceived in a specific spatial region (eyebox). In a preferred embodiment, the hologram can be configured locally such that the deflection function of the laser beam can be effected with adequate diffraction efficiency, i.e. the Bragg condition is met at all sites that contribute to the formation of an image. As a result, in the embodiment of FIG. 3, a possible curvature of the windshield 30 is taken into consideration in the holographic element 33.

Instead of a laser light source, other light sources can also be used for illumination, for example broadband sources such as a halogen lamp in combination with an imaging system.

In the embodiment of FIG. 3, angle of incidence and emission angle of the diffusion screen can also be selected substantially arbitrarily such that an arrangement similar to the arrangement of FIG. 5, adapted to perpendicular windshields, is possible.

In the embodiment illustrated, it is possible in particular to dispense with further optical elements, which permits a compact construction, and a construction is possible e.g. only with an imaging device and a holographic element in or on a windshield.

Tuning the operating wavelengths and the local deflection function of a holographic element used can, in some embodiments, in addition to the function of data projection, provide a protecting function against the light of the nowadays commonly used laser pointers. To this end, the holographic elements already discussed are adapted such that the orientation of the Bragg planes in the hologram layer that ensure the deflection of the data beam path permit blocking of the ingress of light of specific wavelengths (e.g. 532 nm, 640 nm, 450 nm, 405 nm). By way of the preferred configuration of the hologram structures in the form of reflection holograms, the optical blocking action takes place similar to in a dielectric layer system by way of reflection back toward the outside. The distance between the Bragg planes must be configured such that a phase delay of the partial reflections at neighboring Bragg planes of a laser pointer wavelength occurs along the optical path of the beam inside the material. When using volume hologram material with a comparatively large refractive index difference (approximately 0.03) and a comparatively low layer thickness (approximately 10 μm), it is possible to achieve good suppression of the laser light from the outside within an extended angle range (approximately ±10 . . . 30°). The best laser projection exists, for example, for viewing directions running exactly toward the represented image content for exactly the wavelength with which the holographic element operates.

Figure 6:
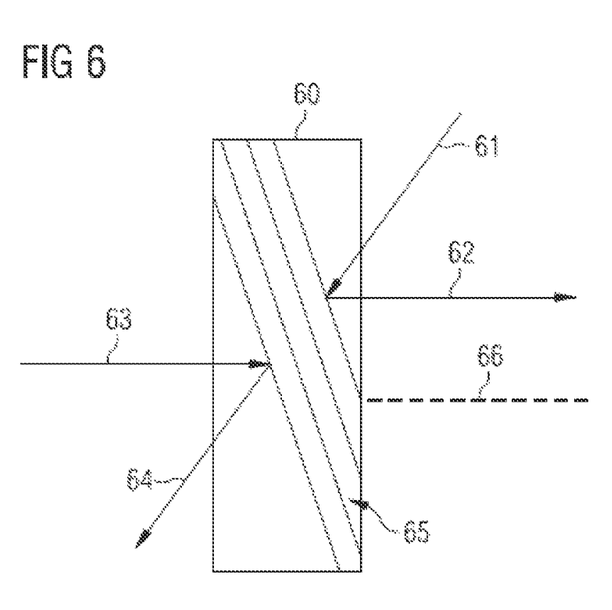
FIG. 6 shows an illustration of a holographic element for protection against laser radiation according to an embodiment.

For a construction as is shown in FIG. 2 or FIG. 5, this will be explained by way of the example of FIG. 6. A holographic element is designated with 60. A holographic element of this type can contain a multiplicity of Bragg planes 65, i.e. planes having slightly different optical refractive indexes, which, in sum, act as selective mirrors, adapted to the pointer wavelengths. An incident beam from an imaging device is designated with 61, which is diffracted as the beam 62 and steered toward a viewer's eye (e.g. as explained with reference to FIG. 3). A normal on the holographic element 60 is designated with 66.

For corresponding wavelengths for which the holographic element is designed, a reflection function can additionally be achieved as protection against a laser beam 63 which is incident from the outside and is substantially reflected (diffracted) as a laser beam 64. The holographic element 60 can be tuned to wavelengths of laser pointers (for example red, green, or blue semiconductor lasers). Such wavelengths can be integrated, in addition to the already mentioned wavelengths for the data projection, into the design of the holographic element 60. In this way, a combined function of data display and laser protection (function integration) of the device is obtained, without additional optically effective elements other than the holographic element (also referred to as combiner hologram). The driver or pilot or viewer would thus be protected by the display with respect to the main viewing directions. In order to adapt this protective function to different configurations of the display system, it is possible to exploit the fact that Bragg gratings, which were designed for a specific angle and a specific wavelength, can efficiently diffract a different wavelength at a different angle.

If the design of the device on the basis of different aspects takes place in a manner such that the main angle of incidence of the object wave starting from the imaging system with respect to the normal vector of the Bragg planes of the grating is for example significantly lower than the expected angle of incidence of a laser pointer, for example by more than 10°, then the operating wavelength of the holographic element for displaying data must in this case be reduced correspondingly with respect to that of the laser pointer (and vice versa). In this way, it would again be possible for the above-mentioned condition with respect to the appropriate phase delay of the partial reflections at the Bragg planes for the laser pointer wavelength to be attained.

Figure 7:
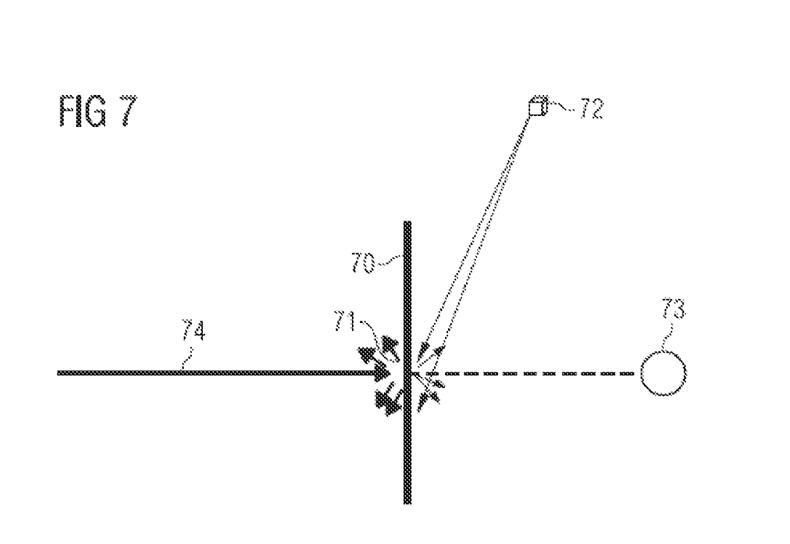
FIG. 7 shows an illustration of a device for data projection according to a further embodiment.

FIG. 7 illustrates a corresponding laser projection function for the case of a holographic diffusion screen (according to the embodiment of FIG. 3). A windshield is designated with 70 and has a holographic diffusion screen 71. As has already been explained with reference to FIG. 3, the holographic diffusion screen 71 can be scanned with light from an imaging device 72, in particular a scanning laser light source with one or more wavelengths, in order to provide data to be projected for an eye/both eyes 73.

If light is incident from the external side, the holographic diffusion screen in the embodiment of FIG. 7 provides a protective function. To this end, the holographic diffusion screen 71 in the embodiment illustrated is tuned, as described above, to corresponding wavelengths. By way of example, in FIG. 7, an incident laser beam 74 is diffusely scattered by the holographic element 71, i.e. the holographic diffusion screen.

Since commercially available laser pointers have comparatively few possible wavelengths, these wavelengths can relatively simply be added to the design of the respectively used holographic element for the protection against laser pointers, without significantly affecting the transparency of, for example, a windshield overall.

Figure 4:
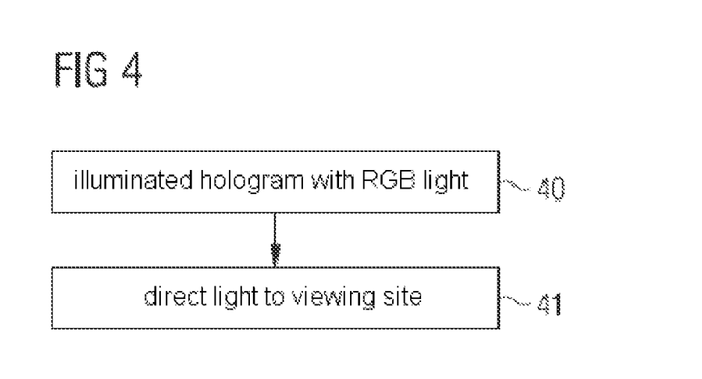
FIG. 4 shows a flow chart for demonstrating a method according to an embodiment.

FIG. 4 shows a flowchart for demonstrating a method according to an embodiment. The method of FIG. 4 can be used in particular for operating the devices of FIGS. 1-3.

In a step 40, a holographic element is illuminated with light in three spectral colors, for example red, green and blue (rgb), wherein the holographic element is preferably transparent for other wavelengths. In step 41, the holographic element then directs the light toward a viewing site, wherein the holographic element to this end can image the light onto an intermediate image, which is viewed from the viewing site (for example as shown in FIG. 2), or the holographic element can serve as a diffusion screen (for example as shown in FIG. 3).

The production of holographic elements according to embodiments will now be explained below with reference to FIGS. 8 and 9.

Figure 8A:
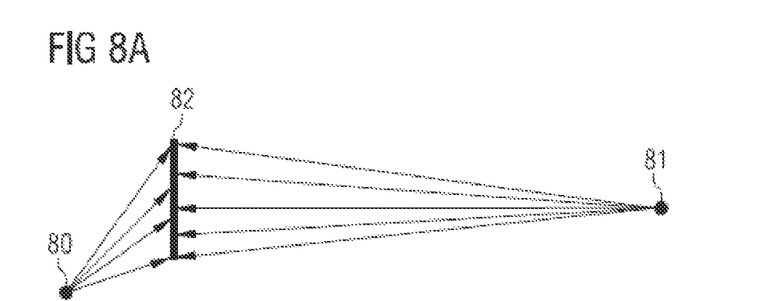
FIG. 8A to FIG. 8C show illustrations for demonstrating the production of a device according to an embodiment.

FIG. 8A illustrates light exposure of a holographic element 82 for data projection purposes, for example according to the embodiment of FIG. 2. Here, for generating a holographic element 82, interference of two opposite spherical waves, which can for example be generated using a coherent laser having a sufficient coherence length, is recorded on the holographic element 82, in particular within a holographic layer. A point light source 80 for emitting one of the spherical waves is here located at the later site of the imaging device and emits what is known as a reference wave, and a further point light source 81 for emitting the other of the spherical waves is located at the site of the later virtual image and emits what is known as a signal wave.

By way of the distance of the two point light sources 80, 81 from the holographic element 82 during the exposure, the later distance of the imaging device from the holographic element 82 and the distance of the later represented virtual image are fixed. If, for example, the point light source 81 is at a distance of 8 m from the holographic element 82, then later, during playback, the virtual image will likewise be located at a distance of 8 m from the holographic element 82.

The distance of the virtual image from the eyebox (i.e. substantially from a viewer's eye), will later correspondingly be at least approximately the sum of the distance of the point light source 80 from the holographic element 82, plus the distance of the point light source 81 from the holographic element 82. It is thus possible in principle to implement any desired distance of the virtual image during later use.

Figure 8B:
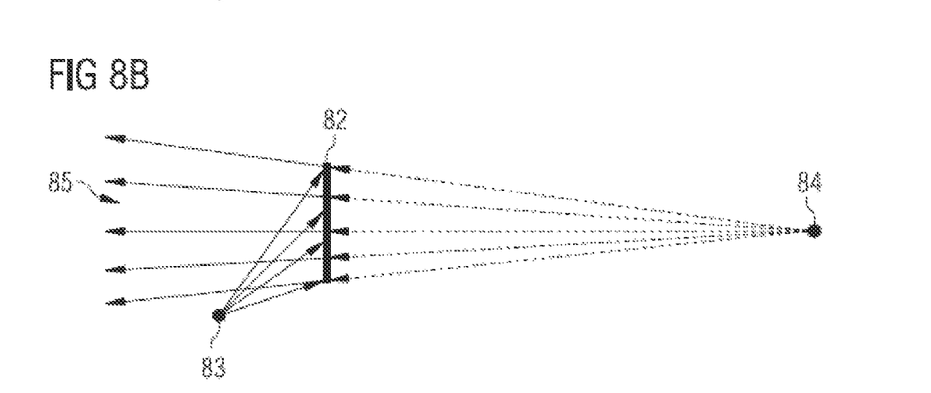

FIG. 8B here shows the application of the holographic element exposed as in FIG. 8A in an "ideal case." The holographic element is illuminated starting from a point light source 83 (corresponding to an imaging device) with reference light, which results in the formation of a virtual image 84 (corresponding to the position of the point light source 81 in FIG. 8A), which can be viewed by an eye (eyebox) at 85.

Figure 8C:
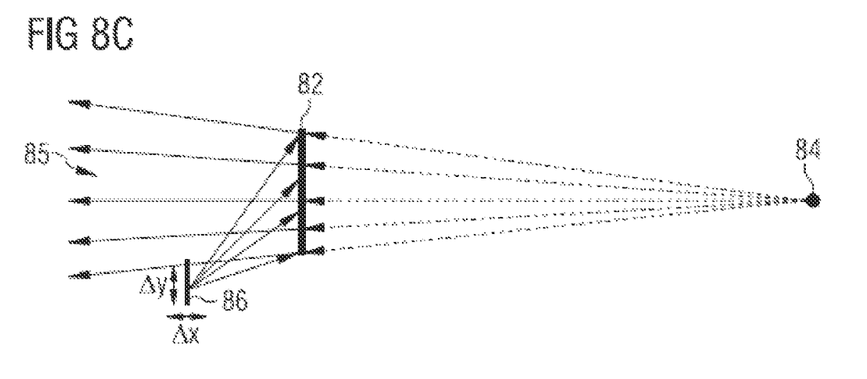

FIG. 8C then shows a real application case. Here, during use, instead of the point light source 83, an imaging device 86 is used, which, as opposed to a point light source, has an extent Δy in the y-direction and an extent Δx in the x-direction. This can result in distortions with respect to the ideal case of FIG. 8B, which are, however, negligible to a certain degree for practical applications, depending on a desired image quality. With preference, here the extent of the imaging device is selected to be comparatively small, and the imaging device is arranged in the vicinity of the site of the point light source 80.

Figure 9A:
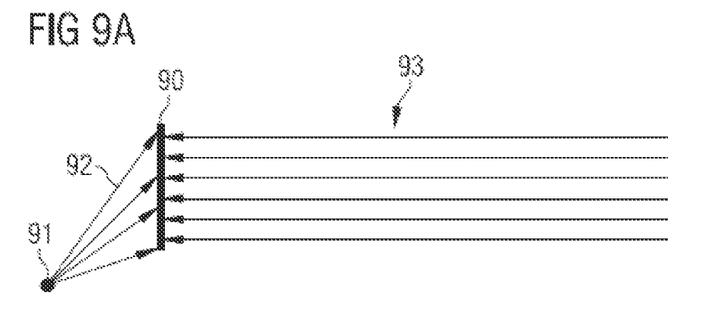
FIGS. 9A and 9B show illustrations for demonstrating the production of the device according to a further embodiment.
Figure 9B:
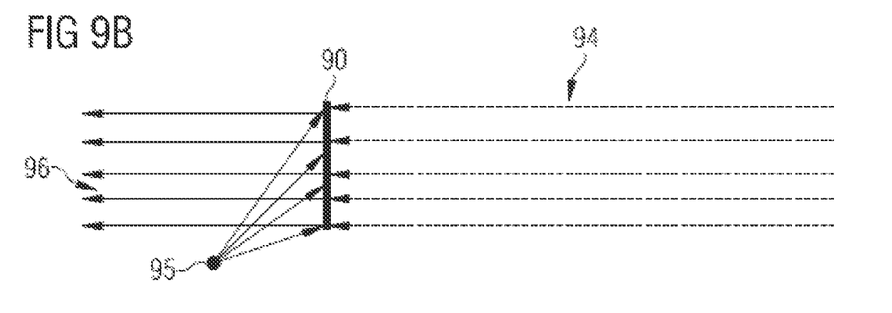

FIGS. 9A and 9B show a further case in which a distance "infinite" of the virtual image from a viewer is implemented.

FIG. 9A here illustrates the light exposure of a holographic element 90. A reference wave 92 is generated by a substantially point-type signal source 91, corresponding to the signal source 80 of FIG. 8A. Instead of a second point-type signal source for generating the signal wave, here a signal wave 93 with a parallel pencil of rays is used, which can be generated for example by a collimated broadened laser beam.

FIG. 9B shows the application of the holographic element 90, which has been exposed as illustrated in FIG. 9. An imaging device 95 (in the ideal case a point-type source, in the real case a source as illustrated in FIG. 8C) illuminates the holographic element 90 from a position which corresponds to a position of the signal source 91. This results in the generation of a virtual image at infinity corresponding to light rays 94, which can be viewed at a site 96.

Production of a holographic element as a diffusion screen can be effected according to FIG. 8A, where in this case the signal wave is generated by a diffusion screen (instead of by the signal source 81), which is located in the vicinity of the holographic element. The holographic diffusion screen is thus recorded in embodiments as a reflection hologram. The form and location of the reference source remain intact, i.e. can be selected like the signal source 80 of FIG. 8A at a suitable angle with respect to the respective holographic element in order to later achieve a suitable arrangement adapted to a respective installation space.

In the embodiments which have been discussed thus far, a virtual image is generated by way of a holographic element and a corresponding imaging device. In other embodiments, a real image can also be generated. Corresponding embodiments will now be explained with reference to FIGS. 10 and 11.

A corresponding modification, i.e. provision of a real image instead of a virtual image, can be effected in all discussed embodiments as long as there is sufficient space between the viewer and the holographic element for generating the real image. In particular, in these embodiments, the real image is generated between the viewer and the holographic element. Such devices are suitable, for example, for representing control elements, which can then be operated by the viewer, wherein conventional devices for gesture recognition (for example camera, distance sensors and the like) can be used to detect the operation. During the operation of the thus produced control element, the representation of the control element (for example head or rotary switch) can be changed according to the operation, for example turning of the rotary switch can be illustrated.

Figure 10:
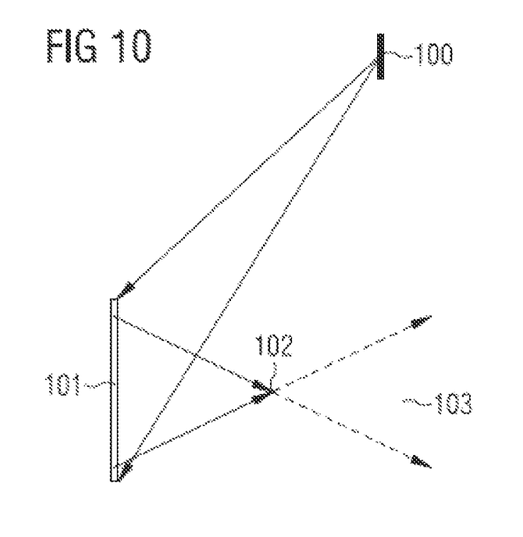
FIG. 10 shows a schematic illustration of a device for data projection according to a further embodiment.

FIG. 10 illustrates an embodiment of a corresponding device. The device of FIG. 10 comprises an imaging device 100, which can be configured like the imaging device in the above-discussed embodiments, and a holographic element 101. In the case of illumination by way of the imaging device 100, the holographic element 101 generates a real image at a site 102, which can be viewed within a box 103. Here, the real image 102 is thus generated between the viewer (at 103) and the holographic element 101.

Figure 11:
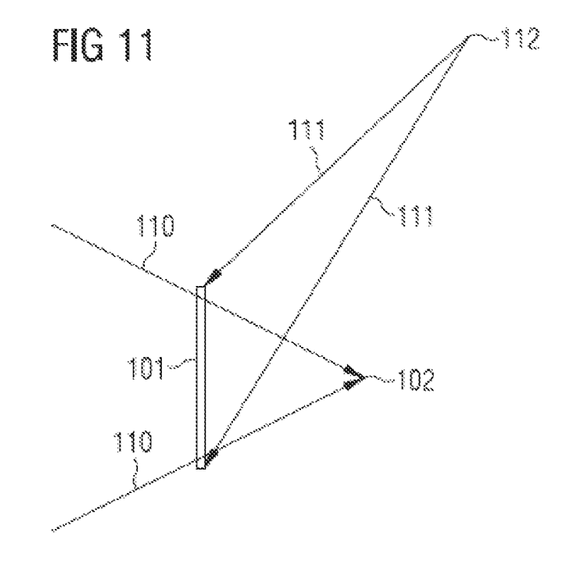
FIG. 11 shows a schematic illustration for demonstrating the production of a device according to the embodiment of FIG. 10.

FIG. 11 illustrates a production process for the holographic element 101 of FIG. 10. For the production, a holographic material, as already discussed above, is exposed to a reference beam (or a reference wave) 111, which diverges starting from a site 112. The site 112 here corresponds to the site where later the imaging system 100 will be arranged. At the same time, the holographic material is exposed to a signal beam (an object wave) 110, which converges toward the site 102 of the real image. As already explained, this exposure can occur separately for different wavelengths, for example a red, a green, and a blue wavelength.

It should be noted that mixed forms are also possible, in which both a virtual image and a real image are generated, for example with different combined volume holograms.

In the embodiments which have been discussed thus far, a virtual or real image is represented in one plane. In other embodiments, image representation (virtual and/or real) can also be effected in a plurality of planes, at different angles and/or generally at different sites. It is possible here to exploit the fact that the holographic elements used, in particular volume holograms, operate, as already described, in both wavelength-selective and angle-selective fashion. It is thus possible for different colors to be imaged to different sites and/or be viewed from different angles, by selecting, for example, the directions and forms of reference beam and the signal beam for different wavelengths during the production of the holographic element.

It is in particular possible to generate color images (real or virtual) at different sites by way of red, green and blue wavelengths, which differ in terms of the wavelength by more than one sensitivity range of the respectively used hologram. For example, the operating wavelengths 532 nm (green), 460 nm (blue) and 660 nm (red) can be used for a first image, while the operating wavelengths 520 nm (green), 442 nm (blue) and 647 nm (red) can be used for a second image. By combining corresponding volume holograms, it is thus possible hereby for example to generate a first virtual image at a first distance from the holographic element, for example 1 m, and a second image at a second distance, for example 5 m, wherein for each of these images a polychromatic representation, including white, is possible. A similar case can also be implemented for monochromatic images with in each case only one wavelength. The image generation can be implemented with a single imaging system, which in that case generates a total of 6 different colors, or with separate imaging systems which can also be arranged at different angles. A viewer in the eyebox then sees both contents at different distances. Here, each holographic element only sees "its own" operating wavelengths and is otherwise transparent. Combinations with even more wavelengths and different distances are also possible.

In embodiments in which the imaging systems are arranged at different sites, it is also possible to use the same wavelengths for both images, since, as mentioned, the holographic elements are also angle-selective. A corresponding embodiment is illustrated in FIG. 12.

Figure 12:
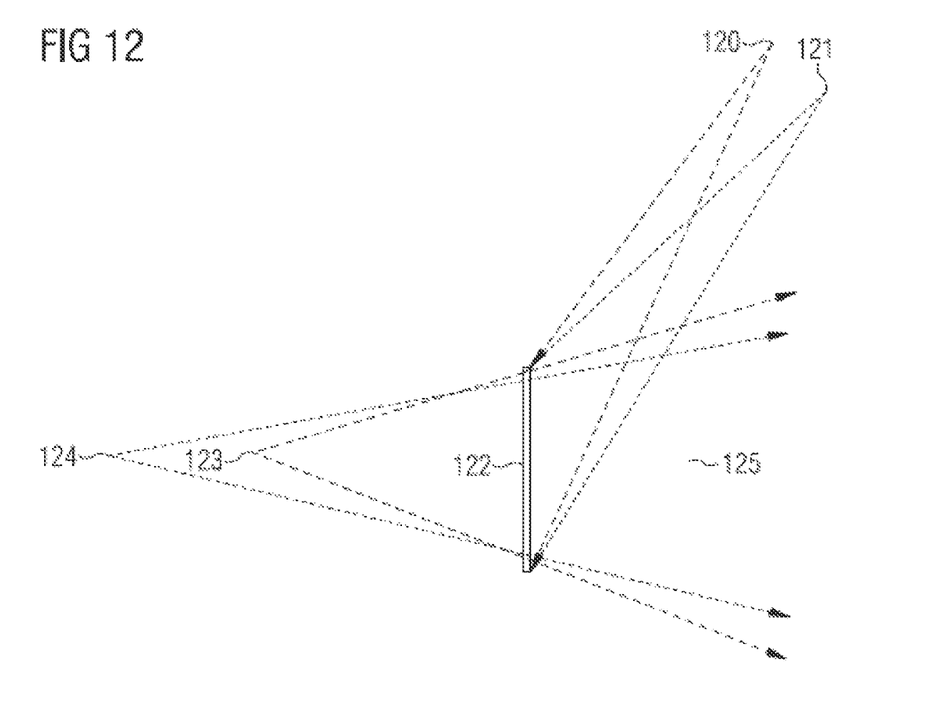
FIG. 12 shows a schematic illustration of a device for data projection according to a further embodiment.

In the embodiment of FIG. 12, a holographic element 122 contains volume holograms for two different imaging systems 120, 121. A virtual image is generated at a site 123 on the basis of light from the imaging system 120, and a virtual image is generated at a site 124, which has a different distance from the holographic element 122 than the site 122, on the basis of light from the imaging system 121. The two virtual images can then be viewed within an eyebox 125. The projection of the volume holograms for the two imaging systems 120, 121 can be effected in each case as described above in separate layers.

In the example illustrated in FIG. 12, the virtual images can be viewed at the sites 123, 124 from the same eyebox 125, i.e. simultaneously. However, other variations are also possible. For example, the holographic element 122 and the imaging systems 120 and 121 can be adapted such that the virtual images can be observed "next to one another," as it were, which can effectively increase the size of the eyebox.

The configuration can also be such that separate images can be viewed from different positions, for example from a driver position and a front passenger position in a vehicle. In this way, different contents can be represented for different persons. It is thus possible overall to provide different virtual or real images by way of one or more imaging systems, possibly with different operating wavelengths, at different sites and/or for viewing from different sites.

In the above-discussed embodiments, a planar virtual or real image is generated by way of an imaging system device and a holographic element. In other embodiments, three-dimensional contents (3D contents) can also be represented.

In some embodiments, similar as described above, separate virtual or real images are generated for this purpose for the left and the right eye in correspondingly small eye boxes. If the images are correspondingly selected with different perspectives, a stereo effect can thus be brought about.

In other embodiments, a 3D imaging system can be used, as a result of which the representation of true virtual or real three-dimensional images is made possible. A corresponding imaging system is schematically illustrated in FIG. 13.

Figure 13:
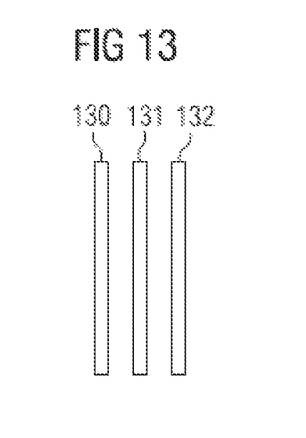
FIG. 13 shows a schematic illustration of a 3D imaging device.

The imaging system of FIG. 13 comprises a surface light source 130, a spatial amplitude modulator 131 and a spatial phase modulator 132. The spatial amplitude modulator 131 can be used to modulate light generated by the light source 130 in a location-selective manner with respect to the amplitude. Examples of such spatial amplitude moderators are for example LCDs, micromirror devices (DMDs) or LCoS arrangements.

The spatial phase modulator 132 can correspondingly be used to modulate the phase of the generated light in a spatially resolved fashion. Corresponding spatial phase modulators are likewise commercially available and can be based, for example, on liquid-crystal technology (e.g. LCoS). It is thus possible to modulate the generated light both with respect to the amplitude and with respect to the phase. Since a 3D impression is brought about in particular by way of different phases of the light that reaches the eye, it is possible with such an arrangement to generate a three-dimensional image. The light source 130 can here also be operated by scanning (for example by way of lasers) to a certain extent, and can have different colors (for example red, green, blue) for a color representation. The imaging system illustrated in FIG. 13 can be arranged at the positions of the imaging systems of the previously discussed embodiments. In the embodiment of FIG. 8C, the artificially generated spatial 3D object is then located in the source point of the reference beam during the recording (reference sign 86 in FIG. 8C) and can thus be reproduced as a 3D object increased in terms of size in the source point of the signal source (reference sign 84 in FIG. 8C) for the respective eyebox. The representation of three-dimensional objects is consequently also possible. Such three-dimensional objects can also be as explained above and used for representing control elements.

By using the illustrated solutions, a high degree of design freedom can be achieved, since less installation space is needed, and in particular also a location of an imaging device can be chosen freely within wide limits. The realization of large-area devices for data projection is simplified, since even in the case of devices having a large viewing field for data projection, no more installation space or hardly any more installation space is required than in small devices (only the size of the holographic element is increased—but applies only to diffusion screen variant with low pane curvature+small viewing angles with respect to the pane normal). In addition, simple solutions for perpendicular windshields are provided. A holographic element which is integrated in a windshield is also robust, for example with respect to solar radiation. An optimum protective function against laser pointer radiation from the outside is possible with a targeted design for the majority of designs.

The embodiments illustrated serve merely for illustrative purposes and are not to be interpreted as limiting.

The invention claimed is:

1. A device for data projection, comprising:
a holographic element to be arranged as an imaging element for a windshield substantially perpendicular with respect to a horizontal axis,
an imaging device comprising,
a first imaging system arranged at a first angle with respect to the holographic element and configured to illuminate the holographic element at a first selective illumination angle with a first illumination light modulated with first image data;
a second imaging system arranged at a second angle with respect to the holographic element and configured to illuminate the holographic element at a second selective illumination angle different from the first illumination angle with a second illumination light modulated with second image data such that on the holographic element the first illumination light overlaps with the second illumination light;
wherein the holographic element comprises,
a first volume hologram structured to be angle-selective for light under the first selective illumination angle and to generate a first two-dimensional virtual image at a first fixed distance from the holographic element corresponding to the first image data; and
a second volume hologram structured to be angle-selective for light under the second selective illumination angle and to generate a second two-dimensional virtual image at a second fixed distance from the holographic element different from the first distance corresponding to the second image data;
the first two-dimensional virtual image and second two-dimensional virtual image are viewable separately and simultaneously at different positions next to one another horizontally by a person when looking at the windshield.

2. The device of claim 1, wherein the first and second volume holograms are provided in separate layers of the holographic element.

3. The device of claim 1, wherein the first and second volume holograms are holograms structured by laser radiation.

4. The device of claim 3,
wherein the first volume hologram is structured by a first reference wave diverging from a site corresponding to the location of the first imaging system relative to the first volume hologram and a first signal beam defining a site of the first image relative to the first volume hologram, and
wherein the second volume hologram is structured by a second reference wave diverging from a site corresponding to the location of the second imaging system relative to the second volume hologram and a second signal beam defining a site of the second image relative to the second volume hologram.

5. The device of claim 1, wherein the first volume hologram includes a first set of Bragg planes, and wherein the second volume hologram includes a second set of Bragg planes.

6. The device of claim 1, wherein the holographic element further includes a reflection function substantially reflecting laser beams of a predefined wavelength incident on the windshield from an outside of the windshield.

7. The device of claim 1, wherein the first image is a real image, and the second image is a real image.

8. The device of claim 1, wherein at least one of the first image or second image represents a control element of a vehicle.

9. The device of claim 1, wherein the first and second imaging systems provide light of the same wavelength or wavelengths.

10. The device for data projection of claim 1 further comprising the holographic element blocking the ingress of light of specific wavelengths of at least one of 405 nm, 450 nm, 532 nm, and 640 nm.

11. The device for data projection of claim 1 wherein the holographic element is wavelength selective in a narrow band and the narrow band is a width of less than 20 nm.

12. A device for data projection, comprising:
a holographic element to be arranged as an imaging element for a windshield substantially perpendicular with respect to a horizontal axis,
an imaging device comprising,
   a first imaging system arranged at a first angle with respect to the holographic element and configured to illuminate the holographic element at a first illumination angle with a first illumination light modulated with first image data;
   a second imaging system arranged at a second angle with respect to the holographic element and configured to illuminate the holographic element at a second illumination angle different from the first illumination angle with a second illumination light modulated with second image data such that on the holographic element the first illumination light overlaps with the second illumination light;
wherein the holographic element is laser-structured to include Bragg planes arranged to be angle-selective for light under the first illumination angle and to generate a first two-dimensional virtual image at a first fixed distance from the holographic element corresponding to the first image data, and to be angle-selective for light under the second illumination angle and to generate a second two-dimensional virtual image at a second fixed distance from the holographic element different from the first distance corresponding to the second image data,
such that the first two-dimensional virtual image and the second two-dimensional virtual image are viewable separately and simultaneously at different positions next to one another horizontally by a person.

13. The device of claim 12, wherein the first image is a real image, and the second image is a real image.

14. The device of claim 12, wherein the first and second imaging systems provide light of the same wavelength or wavelengths.

15. The device of claim 12, wherein a distance of at least one of the first or second image from the holographic element is 2 meters or more.

16. A device for data projection, comprising:
a wavelength-selective holographic element arranged as an imaging element for a windshield substantially perpendicular with respect to a horizontal axis including a reflection function substantially reflecting laser beams wavelength incident on the windshield outside a narrow band from an outside of the windshield using an orientation of a Bragg plane to provide protection by blocking ingress of light from the laser beams;
an imaging device comprising,
   a first imaging system arranged at a first angle with respect to the holographic element and configured to illuminate the holographic element at a first selective illumination angle with a first illumination light modulated with first image data;
   a second imaging system arranged at a second angle with respect to the holographic element and configured to illuminate the holographic element at a second selective illumination angle different from the first illumination angle with a second illumination light modulated with second image data such that on the holographic element the first illumination light overlaps with the second illumination light;
wherein the holographic element comprises,
   a first volume hologram structured to be angle-selective for light under the first selective illumination angle and to generate a first two-dimensional virtual image at a first fixed distance from the holographic element corresponding to the first image data; and
   a second volume hologram structured to be angle-selective for light under the second selective illumination angle and to generate a second two-dimensional virtual image at a second fixed distance from the holographic element different from the first distance corresponding to the second image data; and
   the first volume hologram and the second volume hologram operating to image different colors at different viewing sites, and the first two-dimensional virtual image and the second two-dimensional virtual image viewable from different angles separately and simultaneously at different positions next to each other horizontally by a person when looking at the windshield.

* * * * *

UNITED STATES PATENT AND TRADEMARK OFFICE
CERTIFICATE OF CORRECTION

PATENT NO. : 11,977,227 B2  
APPLICATION NO. : 17/993535  
DATED : May 7, 2024  
INVENTOR(S) : Christoph Erler, Matthias Burkhardt and Alexandre Gatto Page 1 of 1

It is certified that error appears in the above-identified patent and that said Letters Patent is hereby corrected as shown below:

In the Specification

In Column 3, Line 3 change "40" to "40°".

In Column 5, Line 11 change "Narrowband" to "Narrow band".

In Column 5, Line 63 change "red, blue and green" to "red, blue, and green".

In Column 7, Line 2 change "40" to "40°".

In Column 7, Line 9 change "40" to "40°".

In Column 7, Line 18 change "busses" to "buses".

In Column 8, Line 56 change "similar to in a dielectric" to "similar to a dielectric".

In Column 8, Line 66 change "10" to "10°".

In Column 10, Line 8 change "red, green and blue" to "red, green, and blue".

In Column 12, Line 22 change "red, green and blue" to "red, green, and blue".

In Column 12, Line 26 change "(green), 460 nm (blue) and 660 nm (red)" to "(green), 460 nm (blue), and 660 nm (red)".

In Column 12, Line 55 change "than the site 122," to "than the site 123,".

In the Claims

In Column 15, Claim 8, Line 6 change "or second image" to "or the second image".

Signed and Sealed this  
Twenty-fifth Day of June, 2024

Katherine Kelly Vidal  
*Director of the United States Patent and Trademark Office*